Feb. 27, 1973　　T. A. ROSSE ET AL　　3,718,439
ANALYTICAL APPARATUS
Filed June 12, 1970　　2 Sheets-Sheet 1
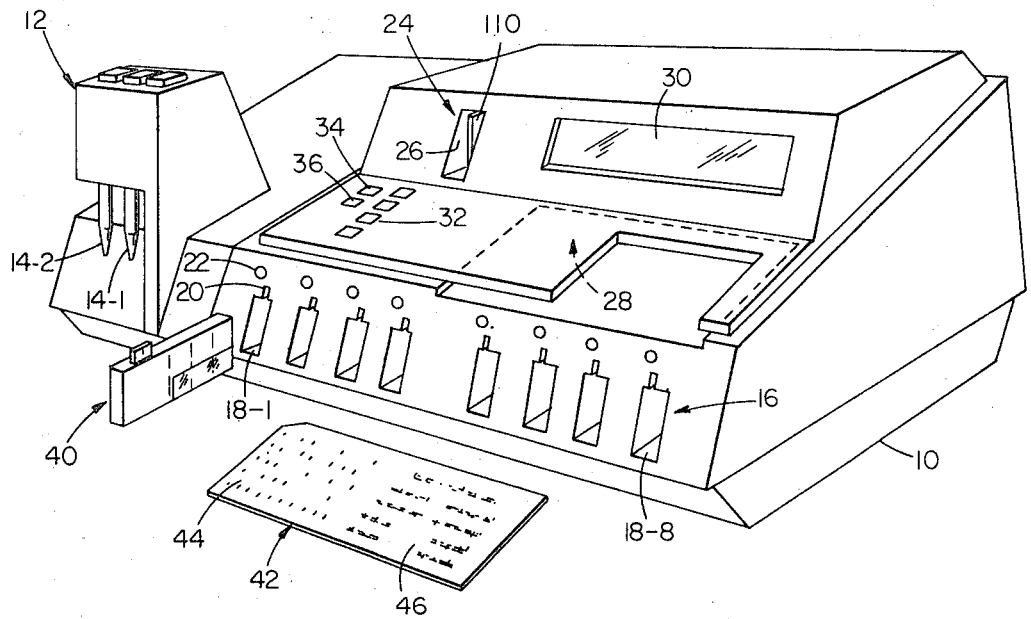
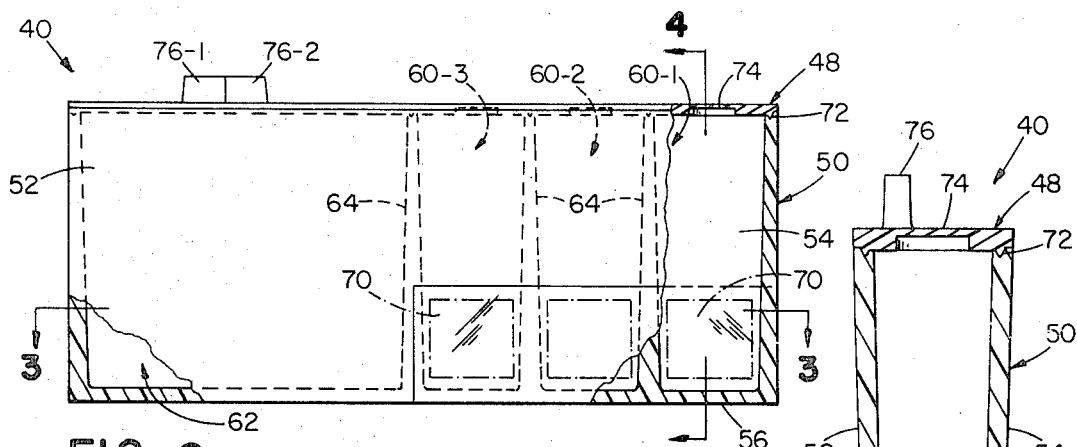
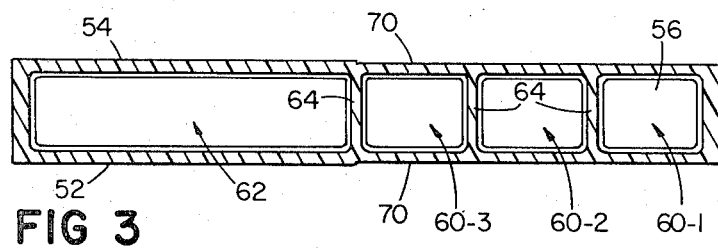
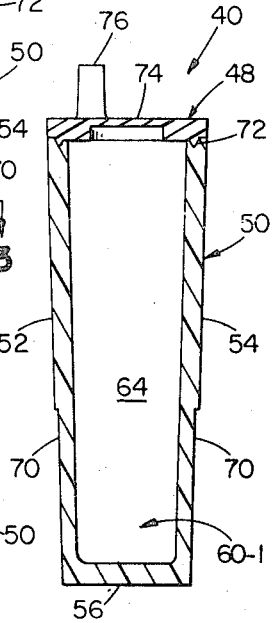

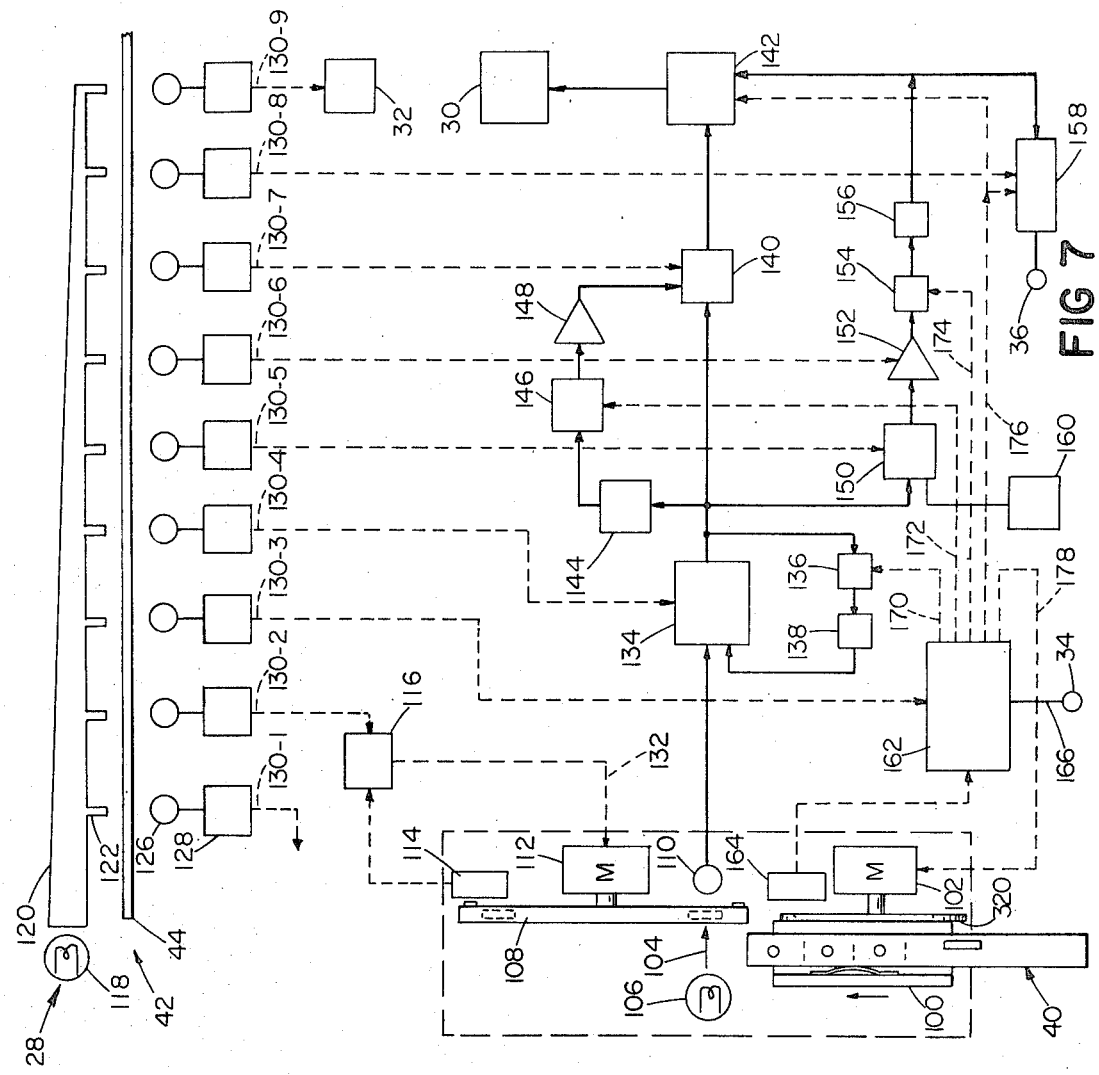
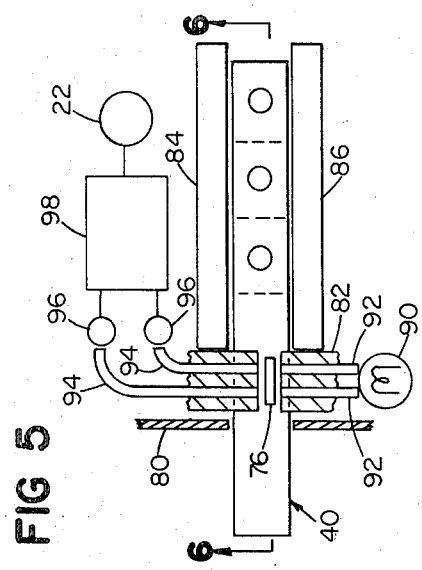
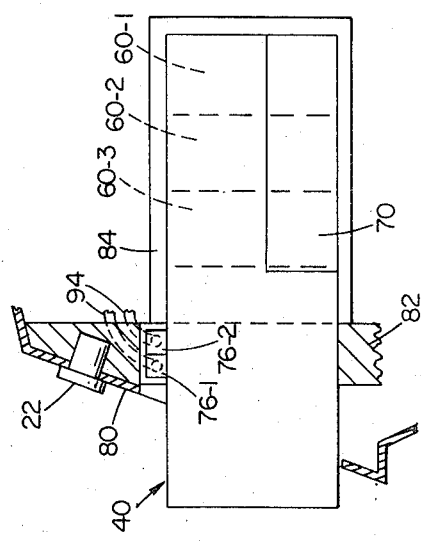

United States Patent Office 3,718,439
Patented Feb. 27, 1973

3,718,439
ANALYTICAL APPARATUS
Thomas A. Rosse, Lexington, David E. Blackmer, Harvard, Jerrold Zindler, Cambridge, and Thomas F. Kelley, Canton, Mass., assignors to Instrumentation Laboratory, Inc., Lexington, Mass.
Filed June 12, 1970, Ser. No. 45,706
Int. Cl. B65d 79/02; G01n 21/34, 33/16
U.S. Cl. 23—259                                9 Claims

ABSTRACT OF THE DISCLOSURE

A cuvette assembly for use with photometric instrumentation includes a body portion that defines a plurality of sample chambers and includes two spaced parallel walls. Each sample chamber is defined in part by the two spaced walls and each wall has an optical window associated with each chamber so that an optical path through each chamber is defined, and the lengths of the optical paths through the chambers are equal.

SUMMARY OF INVENTION

This invention relates to chemical analysis apparatus.
There exists a need for instrumentation that produces accurate chemical analysis data and which can be operated by untrained personnel. Such instrumentation would assist laboratories in contending with the shortage of skilled personnel and as such should minimize the number of operations required, eliminate the need for calculations, and present the analysis results directly, accurately and unambiguously. Chemical analyses may be performed in a variety of manners. In photometric analyses, for example measurements may be made directly, by comparison with a standard, or as a function of the rate of chemical change. Such techniques are frequently employed in the analysis of blood or other body fluids. Frequently as part of a diagnostic procedure, a chemical analysis of a sample of such fluid for enzymes, hemoglobin, cholesterol, glucose etc. provides useful diagnostic information. While laboratory services for performing such analysis are available, the use of such services often entails a delay of several days or more before analysis information is available. In order to facilitate the performance of such analysis by untrained personnel, handling of the chemical materials should be simplified and it is an object of this invention to provide a convenient, pre-packaged, chemical arrangement which facilitates operation of analysis instrumentation by untrained personnel.

Another object of the invention is to provide a novel and improved chemical packaging arrangement for use in analysis instrumentation which enables reagents to be stored in a reliable manner.

Another object of the invention is to provide a novel and improved chemical packaging arrangement which facilitates the obtaining of accurate analytical results.

A further object of the invention is to provide a novel and improved chemical packaging arrangement which permits the performance of a variety of complex chemical analysis through simple manipulation by the operator.

Still another object of the invention is to provide a novel and improved chemical arrangement for use in a photomeric chemical analysis system.

A further object of the invention is to provide novel and improved apparatus that facilitates biochemical analysis at modest expense.

Still another object of the invention is to provide novel and improved apparatus that facilitates analysis of blood and other body fluids.

In accordance with the invention there is provided a cuvette assembly for use with photometric instrumentation that includes a body portion that defines a plurality of chambers and includes two spaced parallel walls. Each chamber is defined in part by the two spaced walls and each wall has optical window means, the optical windows formed in opposed walls of each said chamber defining an optical path through which a beam of light may be passed for analyzing light in the chamber, the lengths of the optical paths through the chambers being equal.

In a particular embodiment, the sample chamber further includes a port and a molded frangible barrier member disposed across each port for providing a seal of that port so that the materials in the sample chambers are maintained in isolation. Coding material molded integrally with the cuvette assembly provides control in the processing of the assembly in an analytical sequence. In a particular embodiment this coding material cooperates with an incubator interlock and also controls the operation of incubator timing mechanism. The cuvette assembly is molded of a chemically inert polymeric material that has optical clarity and thermal and chemical stability, and it is preferred that the material have a light transmission of at least 25% at a wavelength of 3400 angstroms. A particularly useful polymeric material is a methylpentene polyolefin sold under the trade designation TPX Grade R.

In a particular embodiment the cuvette assembly includes three sample chambers and a handle portion forming a fourth chamber. A portion of the two side walls of the cuvette assembly overlying the three sample chambers has an optical surface (preferably having a finish of at least twenty microinches and a flatness of ten wavelengths at Na$^D$) and defines three parallel identical optical paths through which radiation beams (either simultaneously or sequentially) may be passed for analyzing material in the sample chambers. This cuvette assembly is useful for performing a variety of biochemical analyses, and is convenient to use. The assembly provides precise optical paths in the three chambers and temperature stability of the chambers so that accurate analyses may be easily performed.

Other objects, features and advantages of the invention will be seen as the following description of a particular embodiment progresses, in conjunction with the drawings, in which:

FIG. 1 is a perspective view of biochemical analysis apparatus and a cuvette assembly useful with such apparatus that is constructed in accordance with the invention;

FIG. 2 is a side view, with parts broken away, of the cuvette assembly shown in FIG. 1;

FIG. 3 is a sectional view of the cuvvette assembly taken along the line 3—3 of FIG. 2;

FIG. 4 is a sectional view of the cuvette assembly taken along the line 4—4 of FIG. 2;

FIG. 5 is a top plan diagrammatic view of the cuvette assembly and an incubator unit of the apparatus shown in FIG. 1;

FIG. 6 is a diagrammatic sectional view taken along the line 6—6 of FIG. 5; and

FIG. 7 is a block diagram of the photometric system of the apparatus shown in FIG. 1.

DESCRIPTION OF PARTICULAR EMBODIMENT

With reference to FIG. 1 there is shown a biochemical analysis instrument that includes a housing 10 on which is mounted a dispensing unit 12 having two dispensing channels 14–1 and 14–2. To the right of the dispensing unit 12 is an incubator section 16 that includes incubator chambers 18–1—18–8. At the top of each incubator chamber is an interlock slot 20 and above each chamber is an indicator light 22. A photometer section 24 is disposed above the incubator section 16 and includes a slot 26 for receiving a cuvette assembly 40; a card reader unit 28; a digital display 30; a units display 32; a start button 34 and an alarm lamp 36. Used with this instrument is a disposable cuvette assembly 40 and a correlated card 42 which includes a data section 44 having calibrating and control information and an instruction section 46. In a typical system, a kit of twenty cuvette assemblies 40, a supply of a standard (if necessary) for use with the cuvette assemblies 40 and a control card 42 having coded calibrating and control information correlated with the standard material and the analysis to be performed is supplied for use with the instrument. A different kit is provided for each type of analysis.

The cuvette assembly 40, as shown in FIGS. 2–4, is formed of two components, a top 48 and a body portion 50, both formed of suitable material such as glass, or a polymeric material such as a polyolefin, a polycarbonate, or an acrylic. A preferred material is a transparent TPX methylpentene polyolefin material that has absorption of approximately 0.125 optical density at a wavelength of 3400 angstroms; a Vicat softening point of 179° C.; and excellent chemical resistance properties.

The body 50 has two side walls 52, 54, each 0.050 inch thick, that taper outwardly from bottom to top at an angle of about 1°. Side walls 52, 54 are joined together at their bottom by base wall 56. As indicated in FIGS. 2 and 3, three sample chambers 60–1, 60–2 and 60–3 and a handle chamber 62 are formed in the cuvette assembly. These chambers are defined by lateral separator wall members 64 that have a thickness at their upper ends of about 0.040 inch. Each sample chamber 60 has a transverse width between side walls 52, 54 of about 3/8 inch and a lateral width of about 5/8 inch. The height of the cuvette assembly is 1 5/8 inches and its length is four inches. Instruction and/or labeling information may be secured to one or both inner surfaces of the handle chamber 62. Formed in the outer surface of each side wall of the three sample chambers 60 is an optical surface 70 about 9/16 inch in height and having a surface finish in the order of five micro-inches. Each surface is recessed about 0.005 inch to provide a protective zone. In the optical area defined by surface 70, the side wall thickness in each chamber 60 is maintained within a tolerance of 0.0004 inch of the mean wall thickness of the three chambers. The optical path lengths of the three chambers thus are identical within close tolerances.

The cover member 48 has a downwardly projecting ridge 72 which engages the upper surface of the body 50 and, after chemical material has been introduced into one or more of the chambers 60, a hermetic seal of the chambers 60 and 62 is provided as by ultrasonic welding. In the upper wall of each chamber is formed a frangible section 74 of reduced thickness which may be broken away to permit introduction of materials such as a reconstituting agent or the unknown to be analyzed into the sample chambers 60. An interlock key 76, divided into two sections 76–1 and 76–2, projects from the upper surface of the cover member 48. Either section 76–1 or 76–2 may be omitted thus varying the coding.

As shown in FIGS. 5 and 6, each incubator chamber 18 is of cast aluminum and is disposed behind an aperture in the front wall 80 of the instrument. Immediately behind wall 80 is a thermal insulator member 82 which provides thermal isolation between areas outside the instrument and the incubator resistance heater rod elements 84, 86. Four of the incubator chambers (18–1—18–4) have thermistor controlled heaters set at 37° C. and controlled to maintain temperature within 0.3° C. and the other four incubator chambers (18–5—18–8) have thermistor controlled heaters set at 100° C. and controlled to maintain temperature within 1° C. A light source 90 is associated with each pair of incubator chambers 18 and four transmitting fiber optic channels 92, two in each direction, extend from light source 90 with their remote ends supported in the corresponding insulator member 82. A corresponding aligned pair of receiving fiber optic channels 94 are secured in the opposed insulator member and are coupled via photodiodes 96 to timing and control logic 98 which provides three different timing intervals and in turn operates indicator lamp 22 and an audible buzzer (not shown). Normally light from lamp 90 is fed via transmitting fiber optic channels 92 to the receiving fiber optic channels 94 for sensing by photosensors 96. When a cuvette assembly 40 is inserted in a proper incubator chamber 18, the location of projection 76 on the left or right side of assembly 40 being keyed to the position of interlock slot 20, one or both sections 76–1, 76–2 (depending on the coding) block the transmission of light to sensors 96 and operate timing logic 98 to initiate a timing cycle. With this coding three different timing cycles may be initiated, and it will be obvious that other additional timing cycles may be obtained by varying the nature of the coded control tab 76. At the end of the timing cycle selected, logic 98 produces an output that energizes lamp 22 and the buzzer to indicate to the operator that the cuvette assembly 40 in that incubator chamber is ready for photometric section analysis.

A block diagram of the photometric section of the instrument is shown in FIG. 7. That section includes a shuttle 100 (disposed behind port 26) which receives and secures the cuvette assembly 40 in a predetermined location and which is driven via shuttle drive linkage by a motor 102. The shuttle drive sequentially positions the three chambers 60 in an optical path 104 that extends from a twenty watt quartz iodine radiation source 106 through filter wheel 108 to photodiode radiation sensor 110. The filter wheel 108 is in the form of a disc and has six circumferentially disposed filter elements and is rotated by a motor 112. The position of the filter disc is sensed by cooperation of slots in the filter disc and a plurality of photoelectric light sensors and logic (diagrammatically indicated at 114) which provide a binary coded output signal to compare circuit 116.

The card reader 28 which senses the data portion 44 of card 42 has a light source 118 and light distributing system 120 that has fifty output channels 122 arranged in 5 x 10 matrix. A check channel is also provided to verify the proper positioning of the card in the reader. Each sensor channel of the card reader includes a light sensor 126, and one or more of the light sensors are coupled to translating logic 128 which applies control signals over output lines 130. The signals on line 130–1 are applied to control the operation of dispenser 12; the signals on output line 130–2 are applied as an input to comparison logic 116; the signals on output lines 130–3-8 are applied to control the signal processing circuitry that responds to material in the cuvette chambers; and the output signal on line 130–9 is applied to the decimal display unit. The data on the card identifies the particular test and has dispensing information and calibration information as a function of the particular test and the chemicals supplied for performing the test. For example, output channel 130–2 applies a signal to compare circuit 116 and that signal applies an output over line 132 to control the filter wheel drive motor 112. Thus, in response to test mode information stored on the card 42 that is correlated with a particular cuvette assembly 40, on insertion of that card into the card reader, the compare circuit 116 provides an output on line 132 to energize motor 112 and rotate filter wheel 108 until the proper filter element is positioned in the optical path 104. Motor 112 is then de-energized.

The output of radiation sensor 110 is applied to a log converter circuit 134 which provides an output as a logarithmic function of the input signal from photodiode 110. Connected in circuit with the log converter arrangement is a switch 136 and a hold circuit 138. The output of the log converter circuit is applied through a first input of switch 140 to a digital voltmeter 142; along a second path through differentiator 144; filter network 146 and absolute value amplifier 148 to a second input of switch 140; and along a third path through a first input of switch 150, scaling amplifier 152, switch 154 and storage circuit 156. The output of storage circuit 156 is applied to the reference input of the digital voltmeter 142 and to error logic 158 which has an output that energizes error indicator or alarm lamp 36 when the output of the hold circuit 156 deviates from preestablished limits as specified by data from the card reader supplied on output line 130–8. Switch 150 has a second input from a precision voltage source 160. The circuitry also includes control logic 162 which responds to inputs from sensor 164 that provides an indication for position of the cuvette shuttle 100; inputs from the card reader over output lines 130–3; and inputs from start button 34. The logic has outputs over line 170 to control switch 136, over line 172 to control a switch in filter network 146, over line 174 to control switch 154, over line 176 to the digital voltmeter 142 and the error logic 158 in a strobing operation, and on line 178 to control the shuttle drive motor 102.

Additional information concerning this circuitry may be had with reference to copending application Ser. No. 45,758 entitled Analytical System and filed concurrently herewith in the names of Thomas A. Rosse et al. and assigned to the same assignee as this application.

Other correlation or calibration information may be provided. For example, alternatively or supplementarily, correlation may be provided in similar manner between information or indicia on the cuvette assembly 40 and the card 42 positioned in the card reader 28.

A variety of biochemical analyses may be performed with this apparatus. The following table indicates typical examples of the types of tests that may be made with this apparatus:

dred microliters of a sample of the serum to be analyzed (typically that of a patient). A cuvette is then positioned so that chambers 60–2 and 60–3 are aligned with channels 14–1 and 14–2, respectively, and these volumes are discharged into those chambers. Nothing is added to chamber 60–1. After the chambers have been resealed and the contents mixed by inversion, the cuvette assembly 40 is placed in one of the 100° C. incubator units 18–5—18–8 and incubated for twenty minutes.

When the incubation period is complete, the lamp 22 above that chamber lights (and an audible alarm is sounded). With the glucose data card 42 in the card reader 28, the card causes motor 112 to stop the filter wheel 108 so that the 6400 angstrom filter is disposed in the optical path 104 between the lamp 106 and photodiode 110 by an output signal over line 130–2. Gain factors are adjusted in the log converter circuit 134 by an output over line 130–4 and in the scaling amplifier 152 by an output over line 130–6. The card reader also closes switch 150 so that the output from the log converter circuit 134 is applied directly through switch 150 to the scaling amplifier 152, and energizes an appropriate decimal point, and the appropriate units display 32. Depression of the start button 34 applies a signal over line 166 to logic 162 which in turn generates a control signal over line 178 to energize the shuttle drive motor 102.

Initially the cuvette assembly is in the position shown in FIG. 7 (position 1). The shuttle drive advances the cuvette assembly to position 2 so that chamber 60–1 is positioned in the optical path 104. During these intervals, the shuttle position sensor 164 indicates to the logic circuitry 162 the position of the cuvette and during these intervals, the logic circuitry 162 produces an output over line 170 to close the switch 136 in the log converter feed-

| Test | λ/nm. | Units | Incubation temperature, °C. | Normal range | Incubation time (minutes) |
| --- | --- | --- | --- | --- | --- |
| Glucose—Ortho toluidine condensation procedure | 640 | Mg./100 ml | 100 | 60–100 | 20 |
| Urea (BUN)—Diacetyl monoxime procedure | 525 | Mg./100 ml | 100 | 8–18 | 15 |
| Hemoglobin—Cyanmethemoglobin | 505 | G./100 ml | 37 | 10–23 | 5 |
| Total protein—Biuret method | 525 | G./100 ml | 37 | 6–8 | 15 |
| Cholesterol—Liebermann-Burchard reaction | 640 | Mg./100 ml | 37 | 110–250 | 10 |
| Total—Bilirubin | 525 | Mg./100 ml | 37 | 0.6–1.5 | 5 |
| LDH—Wacker | 340 | IU | 37 | 12–50 | 10 |
| GOT—Karem | 340 | IU | 37 | 5–10 | 10 |
| CPK—Roaslki | 340 | IU | 37 | 12–90 | 10 |
| Alkaline phosphatase—Bessey-Lowry | 404 | IU | 37 | 13–42 | 10 |

For each test, a kit of correlated material is supplied, a typical kit including a set of twenty cuvettes 40, a supply of a standard for use with the twenty cuvettes and calibrating data card 42 which contains control data for the particular test, including data on the standard. The components of the kit are related, as by color coding to facilitate operator handling.

This instrument as controlled by a card 42 and card reader 28 is operable in the following three modes:

Standard $R = \dfrac{A_X - A_B}{A_S - A_B} \times K$

Absolute $R = (A_X - A_B) \times K$

Rate $R = \dfrac{dAx}{dt} \times K$

An illustrative example of each mode follows. Determination of serum glucose uses the standard mode. All three cuvette chambers 60–1–60–3 contain four milliliters of liquid reagent (6% orthotoluidine in glacial acetic acid) when it is received by the user. Under the control of card reader 28 and the corresponding "glucose" data card 42, the card reader has an output over channel 130–1 to control dispenser 12 and load dispenser channel 14–1 with one hundred microliters with a glucose serum standard (containing a precisely predetermined 200 milligrams per 100 milliliters, and that is coordinated with the glucose data card 42) and channel 14–2 is loaded with one hundred microliters of a sample of the serum to be analyzed back path, applying the output signal from the log converter through switch 136 and storage circuit 138 as a feedback to the log converter circuit 134 in a zeroing operation. Since chamber 60–1 contains only the "blank" solution (no glucose standard or unknown was added to this chamber) the intensity of light striking the photosensor 110 and its output current corresponds photometrically to the zero concentration of glucose. The log converter circuit 134 has this current applied to it and produces an output voltage equal to the log of the input current. This output signal is fed back through switch 136 and storage circuit 138 as a reference current to the log converter circuit. Switch 136 is then opened and the storage circuit 138 holds this voltage and continues to apply a reference current to the log converter that is proportional to the negative intensity of the blank solution.

The shuttle mechanism, after an interval of about two seconds in position 2, advances the cuvette to position 3 so that standard chamber 60–2 is positioned in the optical path 104. This action is sensed by sensor 164 and applies a signal to logic circuitry 162 to produce an output signal on line 174 to close switch 154. The gain of the scaling amplifier 152 has been set from signals from the card reader over line 130–6 to calibrate the scaling amplifier as a function of the standard glucose solution supplied with the card. During the interval that the "standard" in chamber 60–2 is in path 104, the current generated by sensor 110 causes the log converter 134 to produce an output voltage proportional to log of the absorbance of the standard minus the absorbance of the blank ($A_S - A_B$). After amplification in accordance with the calibrating information from the card reader, this signal is stored as a voltage in storage circuit 156 and applied to the reference voltage input of the digital voltmeter 142.

The shuttle mechanism, again after an interval of about two seconds, advances the cuvette so that the third (unknown) chamber 60-3 is positioned in the optical path 104. Sensor 164 produces a position four output signal to the logic circuitry 162 and that circuitry removes the output signal on line 174 so that switch 154 is opened. The output from the log converter 134 is applied through switch 140 to the analog voltage input of the digital voltmeter 142. This output with the chamber 60-3 in the optical path 104, is proportional to the log of $A_X - A_B$ (the absorbance of the unknown minus the absorbance of the blank). The output of the digital voltmeter applied to display 30 in response to the strobing signal on line 176 is:

$$\frac{A_X - A_B}{A_S - A_B} \times K$$

The number displayed is directly proportional to the concentration of glucose in the unknown serum and the units display 32 indicates that this number is displayed in units of milligrams per one hundred milliliters.

Determination of hemoglobin by the Cyanmethemoglobin procedure employs the absolute mode. In this measurement, chamber 60-1 is empty and is unused in the analysis sequence, and each of chambers 60-2 and 60-3 as supplied in the kit has four milliliters of a reagent. A potassium cyanide tablet is inserted into each chamber 60-2 and 60-3 by the technician to complete the reagent and the dispenser 12 is controlled by output 130-1 of card reader 28 to load fifty microliters of the patient's blood into dispenser channel 14-2. The dispenser is then operated to discharge fifty microliter sample of whole blood into cuvette chamber 60-3. The contents of the cuvette assembly, after the chambers are sealed, are mixed by inversion and the cuvette is incubated in a 37° C. unit for five minutes. When the incubation period is complete (indicated by the corresponding light 22), the hemoglobin control card 42 is placed in card reader 28 and the incubated cuvette assembly 40 is placed in shuttle carrier 100. The card and card reader produces an output on line 130-2 which causes the filter drive motor 112 to position the 5050 angstrom filter in the optical path 104 and sets the gains of log converter 134 and scaling amplifier 152. In addition, switch 140 is set to connect the output of the log converter to the analog input of the digital voltmeter in response to card reader output on line 130-7, and switch 150 is set to connect precision voltage source 160 to the reference input of the digital voltmeter 142 via scaling amplifier 152, switch 154 and storage circuit 156.

Upon depression of start button 34, logic 162 causes motor 102 to advance the cuvette assembly 40 from position 1 through position 2 to position 3. Logic circuit 162 conditions switch 136 to maintain the log converter circuitry in zeroing mode until position 3 is reached (and chamber 60-2 is positioned in the optical path 104). In this position the output of the log converter circuit 134 is $A_S$—the absorbance of the material in chamber 60-2. The log converter zeroing operation is terminated by an output from sensor 164 via logic 162 to switch 136 as the cuvette 40 is advanced by shuttle 100 to position the chamber 60-3 in optical path 104. The output of the log converter 134 is now the value $A_X - A_S$ and is applied via switch 140 to the analog input of digital voltmeter 138. The strobing pulse is generated by logic 162 on line 176 to gate the output value generated by digital voltmeter 142 to digital display 30, and at the same time the strobing pulse applied to the error logic to check whether the scaled precision voltage value is within a preset limit as determined by an output from the card reader on line 130-8. As in the other cases, if the output voltage is outside those limits lamp 36 is energized. Display 30 displays the digital value of hemoglobin in grams per 100 milliliters, the digital voltmeter 142 having generating the ratio $(A_X - A_S) \times kv.$, the output being an absolute absorbance measurement of the sample minus a standard.

Enzyme analyses made in a rate mode. For example, in a determination of lactic dehydrogenase (LDH) by the Wacker method, cuvette assembly 40 when received by the technician has a reagent in powder form in chamber 60-2 only. Three milliliters of distilled water are added to chamber 60-2 to reconstitute the reagent and the materials then mixed by inversion and then incubated at 37° C. for ten minutes. When the incubation period is complete, 100 milliliters of serum is added to chamber 60-2, the chamber is resealed and subjected to mixing and then reincubation at 37° C. The corresponding LDH data card 42 is inserted in card reader 28; filter wheel 108 is rotated to position the 3400 angstrom filter in the optical path 104 in response to an output on line 130-2; logic 162 is signalled that a rate mode of operation is to be performed in response to an output on line 130-3; the log converter 134 is calibrated in response to an output on line 130-4; switch 140 is set to connect the output of amplifier 148 to the analog input of digital voltmeter 142 in response to an output on line 130-7; and the units are set by an output on line 130-9.

In this mode, after the incubated cuvette assembly 40 has been inserted in shuttle 100 upon depression of start button 34, the shuttle is advanced until chamber 60-2 is positioned in the optical path 104. At that point motor 102 is stopped and a timer in logic 162 is released by a signal from sensor 164. The log converter 134 has been in a zeroing mode in response to a signal applied on line 170 to switch 136 and filter network 146 has been reset by signal on line 172. These conditions are released at the start of the timing interval. The initial absorbance reading, transformed to voltage, has been established by the zeroing operation of the log converter circuit 134. Starting from this point a linearly increasing voltage ramp is monitored over a period of time controlled by the timer in logic 162. This ramp signal is differentiated by differentiator circuit 142 to provide a signal which is passed by filter 146 and absolute value amplifier 148 through switch 140 to the analog input of digital voltmeter 142. At the end of the timing interval, the digital voltmeter is strobed by an output on line 176 to digitally display a reading in international units of the amounts of lactic dehydrogenase in the serum.

Thus the invention provides a convenient and versatile assembly for manipulating chemicals in a variety of chemical analyses and is particularly useful in performance of analyses of blood and other body fluids. The cuvette assembly stores reagent materials prior to use and permits ready introduction of materials such as reconstituting agents or the unknown to be analyzed. The invention provides a simple and easy to handle disposable unit which provides accurate reference of two or more chambers to one another chemically, thermally, and optically. Further, the unit may include coding or control information to further simplify the analysis.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

We claim:

1. A cuvette assembly for use with photometric instrumentation, said cuvette assembly having a body portion defining three chambers and including two spaced parallel side walls, two end walls spaced from one another and extending between said side walls, and two spaced buffer walls disposed between said end walls and extending between said side walls to define said three chambers, a portion of the outer surface of each said side wall defining each said chamber defining an optical window, the pair of optical windows of each chamber being opposed and parallel to each other and said pairs of optical windows defining three parallel optical parts of equal and fixed length through said sample chambers through which a beam of light may be passed for analyzing material in the chambers, reagent material disposed in at least one of said chambers for use in performing a particular chemical analysis, and coding structure for cooperation with instrumentation structure into which said cuvette assembly is inserted for controlling the processing of said reagent material in said particular chemical analysis.

2. The cuvette assembly as claimed in claim 1 wherein said body portion includes a body member and a cooperating cover member, a portion of said body member and a cooperating portion of said cover member being secured to one another to define each chamber, each said chamber further includes a port in said cover member, and a molded frangible barrier member disposed across each said port in said cover member for providing a seal of said port so that the material in said chamber may be maintained in isolation.

3. The cuvette assembly as claimed in claim 1 wherein said coding structure is a projecting control tab integral with said cuvette assembly for controlling the processing of said cuvette assembly in an analytical sequence.

4. The cuvette assembly as claimed in claim 1 wherein said cuvette assembly is molded of polymeric material and said side walls have a light transmission of at least 25% at a wavelength of 3400 angstroms.

5. The cuvette assembly as claimed in claim 1 wherein said assembly is molded of a methylpentane polymeric material.

6. A cuvette assembly for use with photomeric instrumentation, said cuvette assembly having a body portion of molded rigid polymeric material, said body portion including two spaced parallel side walls, two end walls spaced from one another and extending between said side walls, and two spaced buffer walls disposed between said end walls and extending between said side walls to define three chambers, a portion of the outer surface of each said side wall defining each said chamber having a recessed optical window of optical quality better than the remainder of said side wall, the pair of optical windows of each chamber being opposed and parallel to each other and said pairs of optical windows defining three parallel optical paths of equal length through said sample chambers through which a beam of light may be passed for analyzing material in the chambers, reagent material disposed in at least one of said chambers for use in performing a particular chemical analysis test, and a projecting interlock key structure extending parallel to said side walls for cooperation with keyway structure of cooperating instrumentation for controlling the processing of said reagent material in said particular chemical analysis.

7. The cuvette assembly as claimed in claim 6 wherein said body portion includes a body member that defines said side walls, end walls and buffer walls, and a cooperating cover member that defines three ports with a molded frangible barrier member disposed across each said port for providing a seal of said port so that material in the chamber associated with each port may be maintained in isolation, a portion of said body member and a cooperating portion of said cover member being secured to one another to define each chamber.

8. The cuvette assembly as claimed in claim 7 wherein said side walls have a light transmission of at least 25% at a wavelength of 3400 angstroms.

9. The cuvette assembly as claimed in claim 8 wherein said assembly is molded of a methylpentane polymeric material.

References Cited

UNITED STATES PATENTS

| | | | |
|---|---|---|---|
| 3,476,515 | 11/1969 | Johnson et al. | 23—253 X |
| 3,497,320 | 2/1970 | Blackburn et al. | 23—230 |
| 3,504,376 | 3/1970 | Bednar et al. | 23—230 |

MORRIS O. WOLK, Primary Examiner

R. E. SERWIN, Assistant Examiner

U.S. Cl. X.R.

23—230 R, 253 R, 292; 206—47 A; 235—151.12; 250—218; 356—39, 246